Patented May 6, 1952

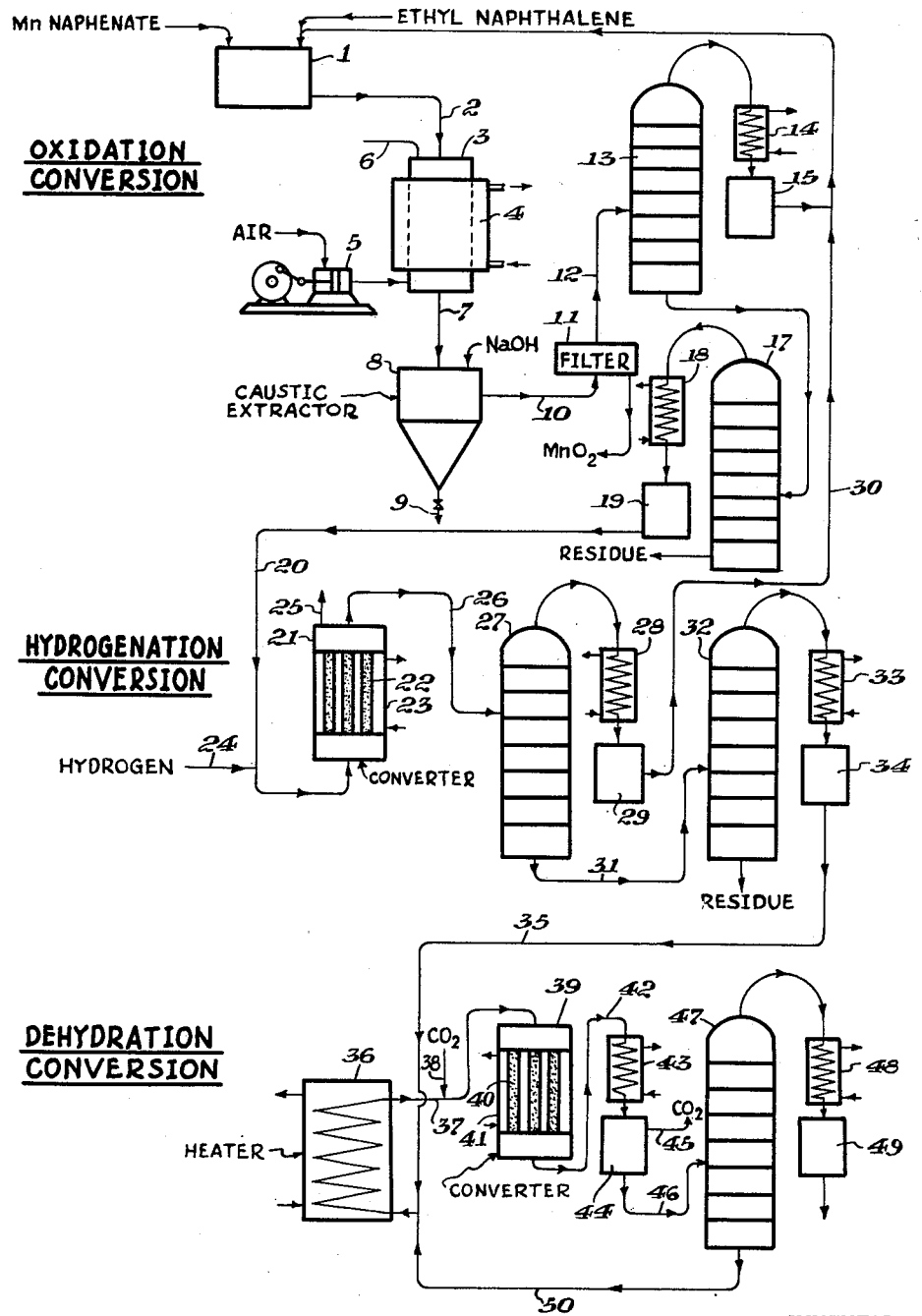

2,595,265

UNITED STATES PATENT OFFICE 2,595,265

PROCESS OF OXIDATION OF ETHYL NAPHTHALENE

Robert Johnson, Verona, Pa., assignor to Koppers Company, Inc., Pittsburgh, Pa., a corporation of Delaware Original application July 13, 1945, Serial No. 604,806. Divided and this application October 5, 1946, Serial No. 701,408. In Canada July 8, 1946

6 Claims. (Cl. 260—586)

This invention relates to the manufacture of derivatives of ethyl naphthalene and more particularly is directed to processes for oxidizing ethyl naphthalene.

This application is a division of my copending application, Serial No. 604,806, filed July 13, 1945, now U. S. Patent 2,468,759 issued May 3, 1949.

This invention has for its objects to provide new and improved methods of making derivatives of ethyl naphthalene, to provide new and improved methods of oxidizing ethyl naphthalene, to avoid the disadvantages of the prior art and to obtain advantages as will appear hereinafter. These objects will become apparent as the description proceeds.

The foregoing objects are accomplished in the present invention by acting upon ethyl naphthalene with oxygen in the presence of an oxidation catalyst at a reactive temperature below that at which substantial dehydration of methyl naphthyl carbinol occurs. Under these conditions the ethyl naphthalene is oxidized to a mixture of methyl naphthyl carbinol and methyl naphthyl ketone. This mixture may be utilized as such or further treated to recover the separate elements or to convert them to other desirable derivatives.

It is possible to obtain vinyl naphthalene by dehydrogenating ethyl naphthalene. As simple as this process appears, however, it is complicated by the difficulty of recovering the vinyl naphthalene from the reaction mixture. The vinyl naphthalene so readily polymerizes that it is difficult to separate vinyl naphthalene from the unchanged ethyl naphthalene by distillation. It is an object of the invention therefore to provide methods for converting ethyl naphthalene to vinyl naphthalene which are free of these disadvantages.

This particular object is accomplished in the present invention by oxidizing ethyl naphthalene to a mixture of methyl naphthyl carbinol and methyl naphthyl ketone, hydrogenating the methyl naphthyl ketone to methyl naphthyl carbinol and dehydrating the methyl naphthyl carbinol to vinyl naphthalene. The unreacted ethyl naphthalene may be distilled off either before or after hydrogenation, or both before and after hydrogenation, so that it is possible by the combination of steps set forth easily and effectively to obtain a high yield of vinyl naphthalene uncontaminated with ethyl naphthalene.

In carrying out the methods of the invention the ethyl naphthalene is first oxidized to a mixture of methyl naphthyl carbinol and methyl naphthyl ketone by acting upon it with air or other suitable oxygen-containing gas in the presence of an oxidation catalyst. The temperature during the oxidation is carefully regulated so that it does not exceed that temperature at which substantial dehydration of methyl naphthyl carbinol would take place. The temperature may siutably range up to about 175° C. but above this temperature dehydration of methyl naphthyl carbinol proceeds too rapidly. Any lower reactive temperature may be used which ordinarily will not be less than about 100° C. The pressure is not critical but may vary from atmospheric or less to 400 p. s. i. or more. The pressure ordinarily will be moderate (less than 100 p. s. i.) in view of the high boiling point of ethyl naphthalene.

Manganous naphthenate has been found to be unusually effective in promoting the oxidation of ethyl naphthalene. With this catalyst, conversions in the order of 20–30% are obtainable at 100–125° C. Water may be present without affecting the conversion other than to slow down the reaction rate. Temperatures higher than 125° C., while permissible, were not observed to give increased overall conversion.

Other materials observed to promote oxidation include cobalt stearate, cobalt naphthenate, cupric acetate, manganous acetate, manganous carbonate, chromic naphthenate and a mixture of manganous acetate and benzaldehyde.

The crude product of the oxidation consists predominantly of unreacted ethyl naphthalene and the balance consists mainly of a substantially equal mixture of methyl naphthyl carbinol and methyl naphthyl ketone along with small amounts of unidentified acidic and neutral by-products. It may be treated in various ways to recover the oxygenated ethyl naphthalene.

A suitable method of refining the crude oxidation product is by distillation. If desired, the crude product may first be extracted with caustic solution to remove the acidic constituents. The unconverted ethyl naphthalene is sufficiently low boiling that it may be easily separated from the oxygenated compounds. The distillation should be effected under a pressure sufficiently below atmospheric to keep the temperature below that at which substantial dehydration of methyl naphthyl carbinol would take place. At a suitable pressure, say 3–5 mm. Hg, the unconverted ethyl naphthalene may be taken off as a first cut (120 to 145° C. at 10 mm. Hg) and recycled to the oxidation, the mixture of methyl naphthyl carbinol and methyl naphthyl ketone taken off as a second cut (145 to 165° C. at 10 mm. Hg) and the neutral by-products as bottoms or alternatively the mixture of methyl naphthyl carbinol and methyl naphthyl ketone may be taken off in the bottoms along with the neutral by-products. These mixtures of alcohols and ketones may be utilized as such or passed on for further processing. Thus the mixture may be subjected to hydrogenation according to a preferred process of the invention in order to convert the ketone to an alcohol, or the mixture may be otherwise treated to separate the alcohol and ketone, for example by esterifying the alcohol and then distilling the ketone away from the ester. These and other methods may be utilized for recovering the various products of the oxidation.

The following table illustrates a typical product distribution:

TABLE I

*Oxidation of ethyl naphthalene[1] at 100° and 125° with 1.5% of manganese naphthenate catalyst*

| Run Number | A | B | C |
|---|---|---|---|
| Temperature, °C | 125 | 100 | 100 |
| Run Duration, hrs | 4 | 4 | 3 |
| Product Density (26°) | 1.024 | 1.022 | 1.020 |
| Product Distribution:[2] | | | |
| Unreacted ethyl naphthalene | 1,117 | 1,255 | 1,153 |
| Methyl naphthyl ketone + methyl naphthyl carbinol | 235 | 238 | 211 |
| Neutral by-products | 64 | 43 | 27 |
| Acidic by-products | 39 | 37 | 30 |

[1] Mixed isomers—about 50% alpha and 50% beta.
[2] The oxidation products were extracted with caustic to remove acidic by-products. The acids were liberated from caustic with acid, taken up in ether, and weighed after solvent removal. The neutral products were distilled at 3-5 mm. to effect separation into unreacted ethyl naphthalene, methyl naphthyl ketone + methyl naphthyl carbinol, and a residue of distillation containing the higher boiling neutral products of oxidation. The products were distilled at low pressure in a column with low pressure drop (Vigreux type) to avoid dehydration of methyl naphthyl carbinol.

In the accompanying flow sheet there is illustrated diagrammatically apparatus suitable for carrying out the oxidation and separation described above. Ethyl naphthalene and manganous naphthenate are introduced into the receiver 1 and the solution of manganous naphthenate in ethyl naphthalene is passed through line 2 into a converter 3 provided with a suitable jacket 4 through which a heat transfer medium may be circulated to maintain the desired temperature in the converter. Simultaneously air is forced into the bottom of the converter by compressor 5, bubbled up through the ethyl naphthalene solution and vented through vent 6. The oxidation product is withdrawn through line 7 into a caustic extractor 8 where it is washed thoroughly with sodium hydroxide solution. This solution, containing the acidic by-products, is withdrawn through line 9 and the washed product is passed through line 10 to filter 11 where the manganous hydroxide and oxide precipitate in the solution are filtered off. The filtrate passes through line 12 into a distillation column 13. The first fraction is taken off as overhead, condensed in a suitable condenser 14 and collected in a receiver 15 whence it is pumped back to the receiver 1 through line 16. The second fraction is taken off as bottoms and further fractionated in column 17. A mixture of methyl naphthyl carbinol and methyl naphthyl ketone distills over and a residue of tarry materials is left as bottoms. The distillate is condensed in condenser 18 and collected in receiver 19 for use as such or for further processing.

In accordance with a preferred operation of the invention the mixture of methyl naphthyl carbinol and methyl naphthyl ketone obtained in the oxidation of ethyl naphthalene, either crude or refined as described above, is hydrogenated to yield a product which is predominantly methyl naphthyl carbinol by acting upon the mixture with hydrogen in the presence of a hydrogenation catalyst at a reactive temperature below that at which substantial dehydration of the methyl naphthyl carbinol takes place. The temperature may suitably range up to about 175° C. but above this temperature dehydration of methyl naphthyl carbinol proceeds too rapidly. Any lower reactive temperature may be used which ordinarily will not be less than about 100° C.

A copper chromite catalyst has been found suitably effective in hydrogenating methyl naphthyl ketone. With this catalyst conversion in the order of 94% of theory was obtained at 100 to 125° C. Other hydrogenating catalysts, such as nickel and nickel alloy catalysts, may be used. Nickel catalysts are less desirable, however, since they are likely to cause hydrogenolysis of the oxygenated product to ethyl naphthalene.

In this operation the methyl naphthyl ketone is reduced to methyl naphthyl carbinol and small amounts of by-products are either formed during the hydrogenation or carried through from the original crude. The hydrogenated product may therefore be treated to recover the desired product methyl naphthyl carbinol in a relatively pure form. This may be effected by distilling the crude hydration product at a pressure sufficiently below atmospheric to give a temperature below that at which substantial dehydration of the methyl naphthyl carbinol takes place. At a suitable pressure, say 4–10 mm. Hg, a low boiling fraction (85–130° C. at 4 mm. Hg) may be taken off as the first cut and either discarded or returned to the oxidation and the methyl naphthyl carbinol may be taken off as the second cut (130–140° C. at 4 mm. Hg) and utilized as such or subjected to further processing such as crystallization. The residue may be discarded.

The following table illustrates a typical product distribution:

TABLE II

*Hydrogenation of methyl naphthyl ketone in the ketone-carbinol mixture to methyl naphthyl carbinol*

| | A | B |
|---|---|---|
| Grams of charge _____ grams | 639 | 2,200 |
| Grams of catalyst _____ do | 50 | 100 |
| Temperature, °C | 115 | 115–120 |
| Product Analysis: (distillation at 2–4 mm.)— | | |
| Forerunnings bp 85–130/4 mm | 25 | 100 |
| Methyl Naphthyl Carbinol bp 130–140/4 mm | 517 | 1,745 |
| Residue | slight | slight |

In the accompanying flow sheet there is illustrated diagrammatically apparatus suitable for carrying out the hydrogenation as described above. The mixture of methyl naphthyl ketone and methyl naphthyl carbinol from receiver 19 is passed through line 20 upwardly through a converter 21. The converter 21 is packed with a suitable hydrogenation catalyst, such as copper chromite, in catalytic tubes 22 which are surrounded by a jacket 23 for circulating a heat transfer fluid around the tubes 22 in order to maintain the catalyst at the desired temperature. Hydrogen is introduced at 24, bubbled up through the converter 21 and vented at 25. The hydrogenated product passes out of the converter through line 26 into the distillation column 27. The light ends are condensed by a condenser 28 and collected in receiver 29 whence they are returned through lines 30 and 16 to receiver 1. The bottoms are passed through line 31 into a second column 32 where methyl naphthyl carbinol is taken off as overhead and any residue as bottoms. The methyl naphthyl carbinol fraction is condensed in a condenser 33 and collected in a receiver 34 whence it may be withdrawn for use as such or for further processing.

In accordance with a preferred embodiment of the invention the methyl naphthyl carbinol recovered from the hydrogenation operation is converted to vinyl naphthalene by passing methyl naphthyl carbinol in contact with a dehydration catalyst which suitably is a surface catalyst such as activated alumina. Under suitable conditions of temperature and pressure dehydration of the methyl naphthyl carbinol is effected. At a temperature of 140° C. methyl naphthyl carbinol is stable for a long period; at 160° C. it is 20% dehydrated in two hours and at 250° C. it is 50% dehydrated in six hours. At higher temperatures and in the presence of a suitable dehydration catalyst, methyl naphthyl carbinol may be substantially completely dehydrated. Unless care is utilized, however, the vinyl naphthalene formed in the dehydration is substantially polymerized.

In order to avoid polymerization of vinyl naphthalene in the dehydration, it is necessary to effect a suitable balance between the temperature of the dehydration reaction and the time of exposure. If the temperature is too high or if the time is too low, undesirable polymerization of vinyl naphthalene takes place. I have found that temperatures between about 300° and 350° C. with a surface catalyst, such as activated alumina, the space-velocity may easily be so regulated as to obtain high conversion of methyl naphthyl carbinol to vinyl naphthalene with substantially no polymerization. Those skilled in the art will readily be able, in view of the illustrative data given, to select space-velocities which are optimum to minimize polymerization. Ordinarily a liquid space-velocity of about 1 or 2 is satisfactory. It is possible also to obtain vinyl naphthalene by distilling methyl naphthyl carbinol over caustic soda in a suitable high vacuum, low pressure drop still. Distillation without polymerization of vinyl naphthalene, however, is difficult and it is preferred, therefore, to effect dehydration over a surface catalyst.

The dehydration is most suitably effected at atmospheric pressure although higher or lower pressures, while not economical, nevertheless may be used. It is desirable to reduce the partial pressure of the methyl naphthyl carbinol vapors over the surface catalyst by diluting them with a suitable inert diluent gas such as carbon dioxide.

A product may be thus obtained which is sufficiently pure for technical purposes. Where a more highly refined product is desired however or where the dehydration through inactivation of catalyst leaves a substantial proportion of the methyl naphthyl carbinol unchanged, the product may be purified by distillation at a pressure sufficiently below atmospheric to give a temperature below that at which substantial polymerization of vinyl naphthalene takes place. Unlike the case of ethyl naphthalene and vinyl naphthalene the boiling points of methyl naphthyl carbinol and vinyl naphthalene are sufficiently different that separation may easily be effected. By effecting distillation at a pressure suitably below atmospheric in a high vacuum, low pressure drop still, the vinyl naphthalene may be distilled free of the methyl naphthyl carbinol without objectionable polymerization.

The following table illustrates typical product distribution:

TABLE III

Dehydration of methyl naphthyl carbinol to vinyl naphthalene over activated alumina with and without $CO_2$ as diluent

| Temp., ° C. | Mols of $CO_2$/mol of feed | Liquid Space Velocity [1] | Total Gas Space Velocity [2] | Catalyst Condition [3] | Product Analysis | |
|---|---|---|---|---|---|---|
| | | | | | Per Cent Vinyl Naphthalene | Per Cent Methyl Naphthyl Carbinol |
| 310 | 0 | 1.8 | 290 | Fresh | 39 | |
| 325 | 0 | 1.7 | 270 | do | 71 | |
| 330 | 3.6 | 1.0 | 730 | do | 81 | 8 |
| 300 | 3.6 | 1.0 | 730 | do | 85 | 1 |
| 325 | 3.6 | 1.0 | 730 | continued | 80 | 1 |
| 340 | 1.7 | 2.1 | 910 | do | 72 | 13 |
| 300 | 2.1 | 1.7 | 850 | do | 54 | 24 |
| 300 | 2.5 | 1.4 | 800 | do | 51 | 33 |

[1] Liquid space velocity is equivalent to ml. of methyl naphthyl carbinol per ml. of catalyst per hour.
[2] Total gas space velocity is equivalent to ml. of gaseous methyl naphthyl carbinol + $CO_2$ at standard conditions per ml. of catalyst per hour.
[3] Fresh catalyst as indicated in the table was charged to the unit before starting the run whereas in other runs the catalyst from preceding run was used.

In the accompanying flow sheet, there is illustrated diagrammatically apparatus suitable for effecting dehydration of methyl naphthyl carbinol to vinyl naphthalene. Methyl naphthyl carbinol from receiver 34 is passed through a line 35 into a heater 36 where it is heated as required to vaporize it. The vapors pass through line 37 where they are diluted with carbon dioxide at 38 into the dehydration converter 39. The converter 39 is packed with activated alumina as catalyst in the converter tubes 40 which are surrounded by the jacket 41 by means of which a heat transfer medium may be circulated in contact with the tubes 40. The vapors pass through line 42 into the condenser 43 and the condensate is collected in the receiver 44 for use as such or for further processing. The carbon dioxide is vented at 45. The carbon dioxide may be preheated if desired to supply all or part of the heat necessary to vaporize the carbinol. If the distillation is conducted under optimum conditions which have been described above, high yield of vinyl naphthalene free of polymers and methyl naphthyl carbinol may be obtained. Should substantial quantities of these products be formed, however, they may be separated by distillation. Thus the vinyl naphthalene from receiver 44 may be passed through line 46 into distillation column 47 from which vinyl naphthalene may be recovered as overhead, condensed in condenser 48 and collected in receiver 49 and methyl naphthyl carbinol may be taken off as bottoms and returned through line 50 to the hydrogenation conversion.

While I have described my invention with reference to particular embodiment thereof, it will be understood that variation may be made therein without departing from the spirit and scope of the invention.

I claim:

1. In a process for producing methyl naphthyl carbinol and methyl naphthyl ketone from ethyl naphthalene, the steps of acting upon ethyl naphthalene with an oxygen-containing gas in the presence of a heavy metal salt selected from the class consisting of cobalt stearate, cobalt naphthenate, cupric acetate, manganous acetate, manganous carbonate, manganous naphthenate, and chromic naphthenate at a reactive temperature below that at which a substantial dehydration of methyl naphthyl carbinol occurs, separating off insoluble materials and acidic by-products, subjecting the remainder to distillation at a pressure below atmospheric to distill over methyl naphthyl carbinol at a temperature below that at which substantial dehydration of methyl naphthyl carbinol occurs, and recovering in said distillation a fraction boiling substantially as the mixture of methyl naphthyl carbinol and methyl naphthyl ketone produced by the oxidation.

2. The process of claim 1 in which the oxidation is conducted at a temperature at which methyl naphthyl ketone and methyl naphthyl carbinol are the principal oxidation products.

3. The process of claim 2 in which the oxidation is effected at a temperature of about 100–125° C.

4. The process of claim 1 in which the heavy metal salt is manganous naphthenate.

5. The process of claim 4 in which the oxidation is conducted at a temperature at which methyl naphthyl ketone and methyl naphthyl carbinol are the principal oxidation products.

6. The process of claim 5 in which the oxidation is effected at a temperature of about 100–125° C.

ROBERT JOHNSON.

REFERENCES CITED

The following references are of record in the file of this patent:

UNITED STATES PATENTS

| Number | Name | Date |
|---|---|---|
| 1,813,606 | Binaphl et al. | July 7, 1931 |
| 2,302,467 | Palmer et al. | Nov. 17, 1942 |
| 2,376,674 | Emerson et al. | May 22, 1945 |

OTHER REFERENCES

Petrov et al. (1) Papers Karpov Chem. Inst. Bach Memorial, vol. 1927, pp. 157–68 Chem. Abst., vol. 22, col. 3285 (1928).

Petrov et al. (2) Trans. Karpov Inst. Chem., 1926, No. 5, pages 81–9 Chemical Abstracts, vol. 22, col. 2073 (1928).